(12) United States Patent
Harano

(10) Patent No.: US 6,225,952 B1
(45) Date of Patent: May 1, 2001

(54) PORTABLE COMPACT RADIO TERMINAL DEVICE

(75) Inventor: Nobuya Harano, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/328,506

(22) Filed: Jun. 9, 1999

(30) Foreign Application Priority Data

Jun. 11, 1998 (JP) .................................................. 10-163381

(51) Int. Cl.[7] ................................ H04Q 7/32; H04Q 1/24
(52) U.S. Cl. .............................................. 343/702; 455/90
(58) Field of Search ................................. 343/702, 741; 455/90

(56) References Cited

FOREIGN PATENT DOCUMENTS

| | | |
|---|---|---|
| 56-6109 | 6/1954 | (JP) . |
| 59-189308 | 12/1984 | (JP) . |
| 61-72906 | 5/1986 | (JP) . |
| 62-21302 | 1/1987 | (JP) . |
| 2-86201 | 3/1990 | (JP) . |
| 3-289801 | 12/1991 | (JP) . |
| 5-6944 | 1/1993 | (JP) . |
| 5-97113 | 12/1993 | (JP) . |
| 6-9217 | 2/1994 | (JP) . |
| 6-164432 | 6/1994 | (JP) . |
| 94/19873 | 9/1994 | (JP) . |
| 7-506236 | 7/1995 | (JP) . |
| 7-263931 | 10/1995 | (JP) . |
| 8-23218 | 1/1996 | (JP) . |
| 8-8629 | 1/1996 | (JP) . |
| 8-162823 | 6/1996 | (JP) . |
| 10-4307 | 1/1998 | (JP) . |

*Primary Examiner*—Don Wong
*Assistant Examiner*—James Clinger
(74) *Attorney, Agent, or Firm*—Sughrue, Mion, Zinn, Macpeak & Seas, PLLC

(57) ABSTRACT

A portable compact radio terminal device includes a radio board to which a loop antenna is connected, and a control board having a display section and a battery and connected parallel to the radio board through a connector. At least one end of a parallel portion of the loop antenna is formed into an arcuated shape. The loop surface of the antenna is perpendicular to the radio board and the control board, and a gap is formed between the loop surface of the loop antenna and an end portion of the radio board.

9 Claims, 5 Drawing Sheets

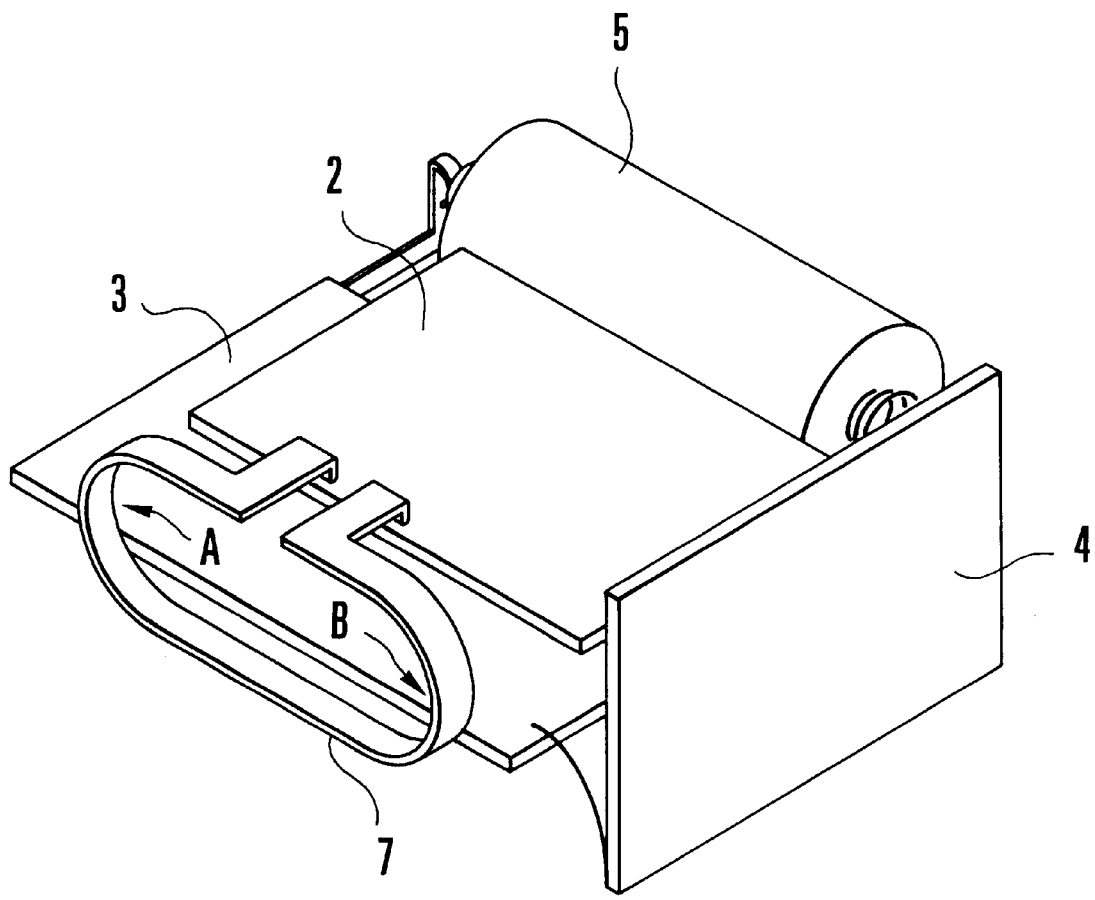
F I G. 4

PORTABLE COMPACT RADIO TERMINAL DEVICE

BACKGROUND OF THE INVENTION

The present invention relates to a portable compact radio terminal device and, more particularly, to a portable compact radio terminal device which is suited for a radio mobile terminal and can obtain a high antenna gain.

With recent abrupt advances in performance and miniaturization of mobile terminals, the corresponding techniques have remarkably advanced. As compared with advances in circuit techniques, devices, and the like, however, antennas with higher performance and smaller sizes are difficult to realize. This poses a problem in the design of mobile terminals.

Pagers, which are currently regarded as the smallest of mobile radio devices, are often carried by people. Demands have therefore arisen for antennas that can obtain high gains even when people carry the pagers. Loop antennas are antennas designed to detect magnetic fields, which exhibit no decrease in antenna gain even when the pagers are carried by people. For this reason, many recent pagers use loop antennas in the form of a rectangle or a rectangle with round corners.

With recent advances in miniaturization of pagers, demands have arisen for smaller loop antennas incorporated in the pagers. If, however, a pager is reduced in size, a state-of-the-art loop antenna cannot ensure an antenna loop opening area that is required to ensure the same antenna gain as the current antenna gain. In addition, the antenna tends to be affected by metal parts that interfere with magnetic fields. It is therefore difficult to obtain desired antenna characteristics.

SUMMARY OF THE INVENTION

It is, therefore, the principal object of the present invention to provide a portable compact radio terminal device which can obtain a high antenna gain while attaining a reduction in the size of the device including an antenna.

It is another object of the present invention to provide a portable compact radio terminal device which reduces the influences of metal parts on an antenna to increase the antenna gain.

In order to achieve the above objects, according to the present invention, there is provided a portable compact radio terminal device constituted by a radio board to which a loop antenna is connected and a control board having a display section and a battery and connected parallel to said radio board through a connector, wherein at least one end of a parallel portion of said loop antenna is formed into an arcuated shape, a loop surface of said antenna is perpendicular to said radio board and said control board, and a gap is ensured between the loop surface of said loop antenna and an end portion of said radio board.

BRIEF DESCRIPTION OF THE DRAWINGS

FIG. 4 is a perspective view showing the arrangement of a portable compact radio terminal device according to the second embodiment of the present invention;

DESCRIPTION OF THE PREFERRED EMBODIMENTS

The embodiments of the present invention will be described in detail below with reference to the accompanying drawings.

Figure 1:
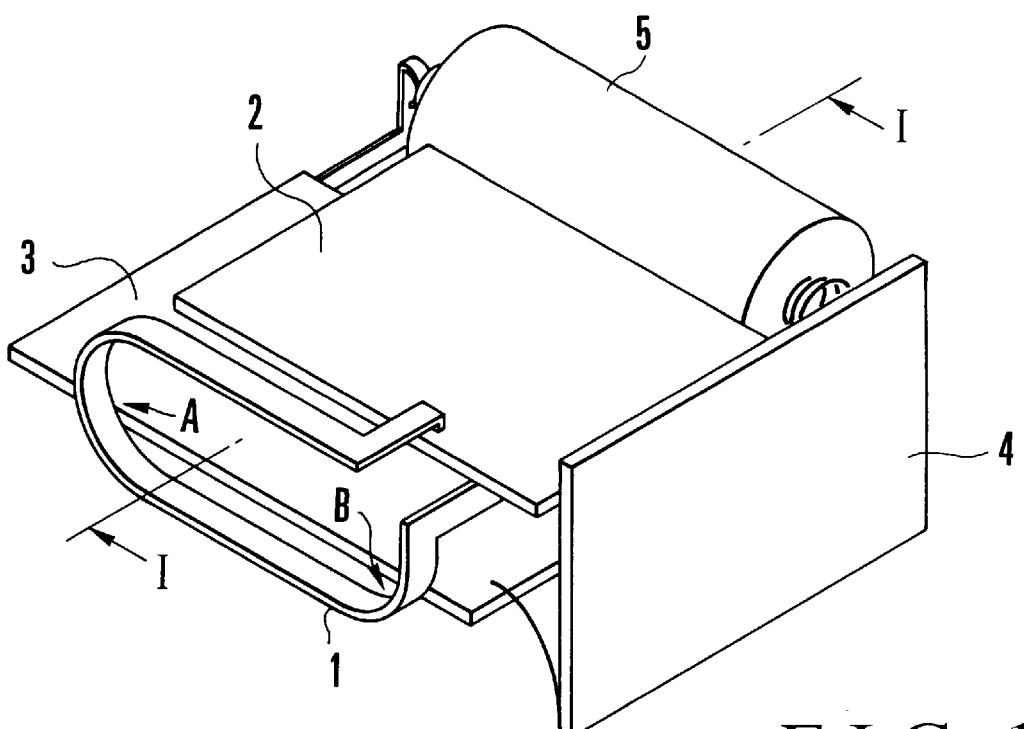
FIG. 1 is a perspective view showing the arrangement of a portable compact radio terminal device according to the first embodiment of the present invention.
Figure 2:
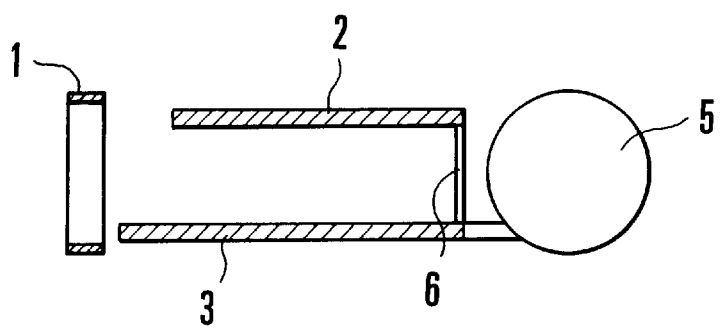
FIG. 2 is a sectional view taken along a line I—I in FIG. 1.
Figure 3:
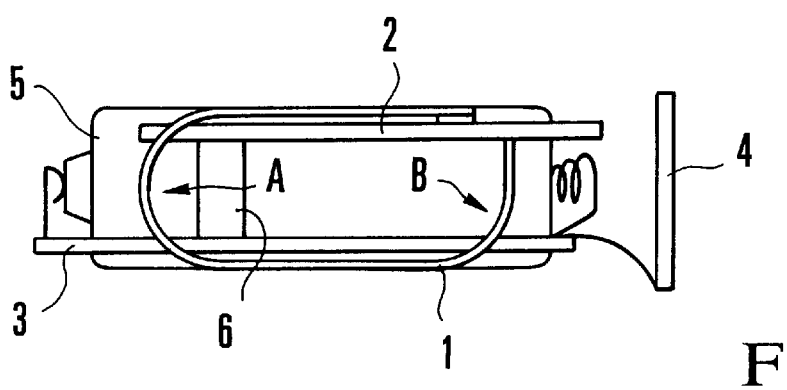
FIG. 3 is a side view of the portable compact radio terminal device according to the first embodiment of the present invention when viewed from a loop antenna opening.

FIG. 1 shows the arrangement of the first embodiment of the present invention. FIG. 2 shows a cross-section taken along a line I—I in FIG. 2. FIG. 3 shows a loop antenna opening according to the first embodiment of the present invention.

A loop antenna 1 is connected to a radio board 2 at two positions. The connecting portions of this antenna are bent at a right angle with respect to the loop portion of the loop antenna 1. When the loop antenna 1 is mounted, the radio board 2 and a control board 3 become perpendicular to the loop surface of the loop antenna 1, and a gap is ensured between the radio board 2 and the loop portion of the loop antenna 1, as shown in FIG. 2. This prevents the radio board 2 and the control board 3 from blocking the loop opening surface. By separating the loop antenna 1 from the radio board 2, the influences of metal parts on the antenna are reduced to suppress a reduction in the antenna gain of the loop antenna. The larger this gap, the better. However, the limit of the gap is about 5 mm in consideration of a space. In addition, a display section 4 and a battery 5 are connected to the control board 3 placed parallel to the radio board 2. The control board 3 is connected to the radio board 2 through a connector 6.

As shown in FIG. 3, one end of the parallel portion of the loop antenna 1 in this embodiment is made of a belt-like conductor in the form of a semicircle (on the side indicated by an arrow A), and the connecting portions of the loop antenna 1 are connected to the radio board 2 at positions shifted from the middle position (to the right side in FIG. 3). In this embodiment, only the corner of an end portion of the loop antenna 1 on one side (lower side in FIG. 3) is in the form of a ¼ circle (on the side indicated by an arrow B) to allow the end portion to be connected to the radio board 2. Although the highest gain can be obtained when a loop antenna is formed to include semicircular portions in this manner, the antenna may be formed into an arcuated shape such as a semi-elliptic shape in addition to a semicircular shape.

The operation of this embodiment will be described next.

In this embodiment, the loop antenna 1 is connected to a radio circuit on the radio board 2 through a matching circuit. In general, however, one or both of the connecting portions are grounded by a phase matching capacitor. With this arrangement, the antenna portion, the phase matching capacitor, and the ground portion constitute one loop to form a resonance circuit. This circuit operates as an antenna.

Another embodiment of the present invention will be described below.

FIG. 4 shows the arrangement of the second embodiment.

According to the arrangement of this embodiment, two connection positions of a loop antenna 7 are located closer to the middle position of the radio board 2 than in the first embodiment (FIG. 1), and the two ends (on the two sides indicated by arrows A and B) of the parallel portion are formed into semi-circular shapes. These two ends may have semi-elliptic shapes instead of semicircular shapes.

An efficiency η of the loop antenna is determined by the radiation resistance and loss resistance of the antenna and generally expressed as:

$$\eta = Rr/(Rr+R1) \qquad (1)$$

where Rr is the radiation resistance and R1 is the loss resistance.

The radiation resistance Rr increases as the loop opening area increases. The loss resistance R1 increases as the loop length increases. Antennas that are made of the same conductor and have the same antenna loop length have the same loss resistance R1, but an antenna having a larger antenna loop opening area has a larger radiation resistance Rr and hence has a higher antenna efficiency η.

Figure 5:
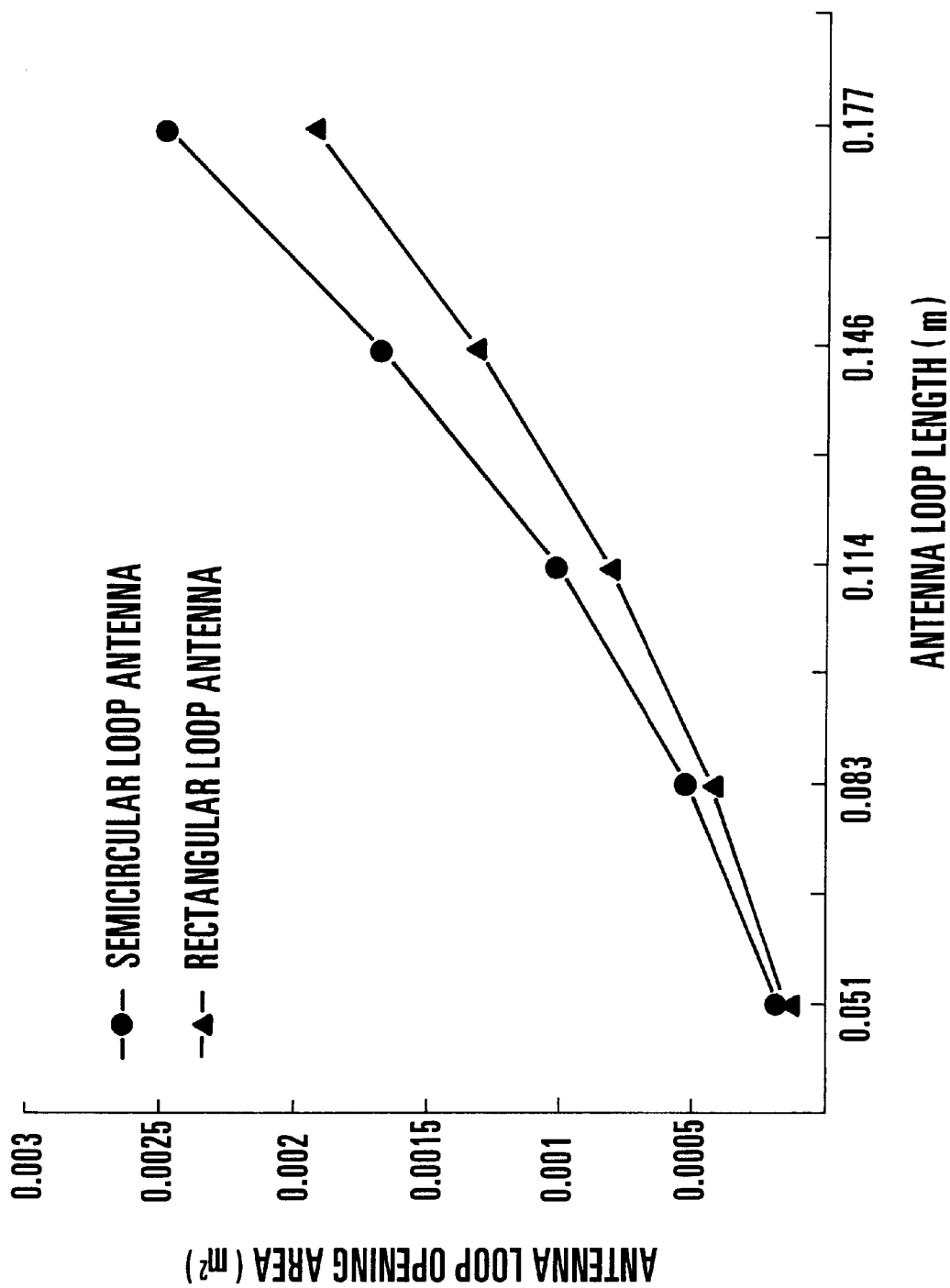
FIG. 5 is a graph showing the relationships between the antenna loop lengths and the antenna loop opening areas of the antenna of the present invention and a conventional antenna.

FIG. 5 shows the comparison between the antenna loop opening area of a rectangular loop antenna and that of a loop antenna having two semicircular end portions according to this embodiment when they have the same antenna loop length. Note that the rectangular loop antenna has an aspect ratio of 1:1. It is obvious from this result that the semicircular loop antenna has a larger antenna loop opening area than the rectangular antenna when they have the same antenna loop length. Since the two ends of the loop antenna of this embodiment are rounded, the loop antenna has a higher antenna efficiency than the rectangular loop antenna. When the two ends are formed into semi-circular shapes, in particular, the maximum antenna efficiency can be obtained.

In general, the peripheral portion of the housing of a portable radio terminal has round corners to have a better design or keep the housing strong. A device to be incorporated in the housing must be designed in accordance with the shape of the housing. If a rectangle loop antenna to be incorporated in the peripheral portion of the housing is shaped to avoid the round corners of the housing, the antenna size must be decreased. This may decrease the antenna gain. In contrast to this, with the loop antenna of the present invention, a high antenna efficiency can be obtained without being influenced by the round corners of the inner portion of the housing.

Still another embodiment of the present invention will be described below.

Figure 6:
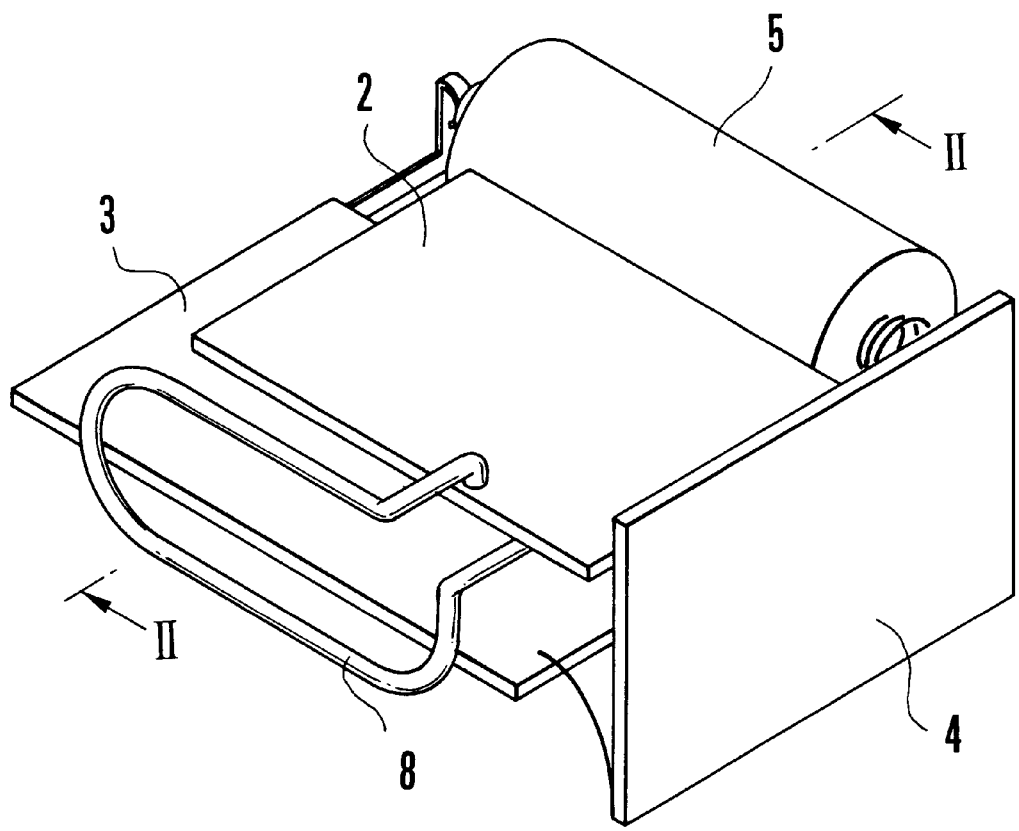
FIG. 6 is a perspective view showing the arrangement of a portable compact radio terminal device according to the third embodiment of the present invention.
Figure 7:
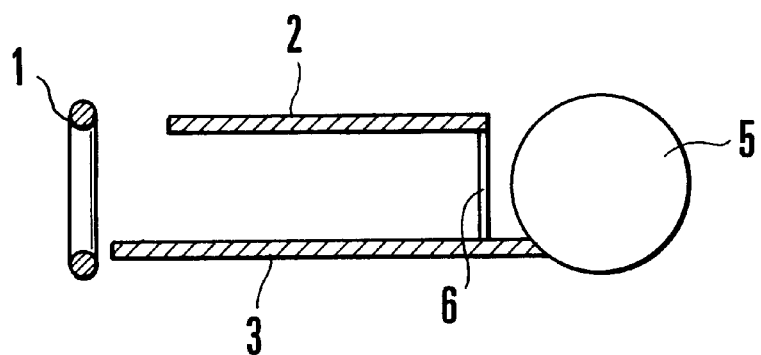
FIG. 7 is a sectional view taken along a line II—II in FIG. 6.

FIG. 6 shows the arrangement of the third embodiment. FIG. 7 shows a cross-section taken along a line II—II in FIG. 6.

According to the arrangement of this embodiment, the antenna conductor of a loop antenna 8 having one end of a parallel portion formed into a semicircular shape is a linear conductor having a substantially circular cross-section. With this arrangement, a loss resistance R1 of the loop antenna 8 can be reduced as compared with the loop antenna 1 in FIG. 1 formed by using a belt-like conductor having the same conductor surface area. Therefore, an antenna with a higher efficiency can be formed.

Still another embodiment of the present invention will be described below.

Figure 8:
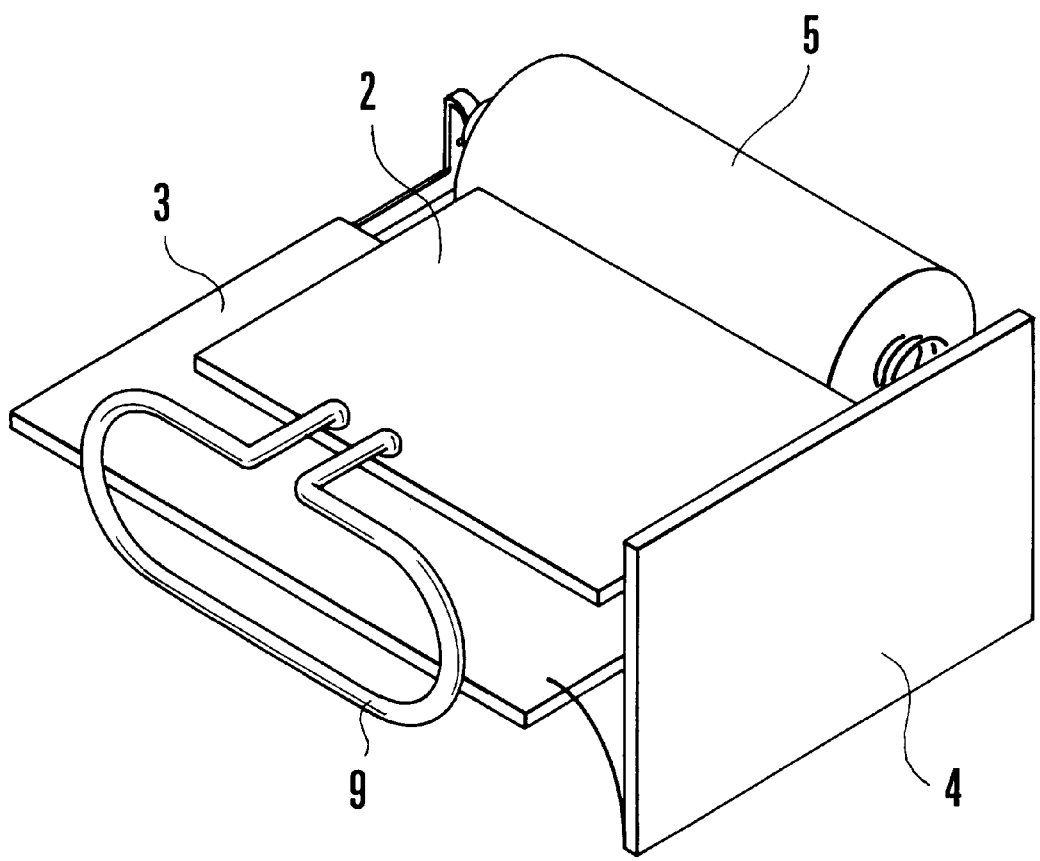
FIG. 8 is a perspective view showing the arrangement of a portable compact radio terminal device according to the fourth embodiment of the present invention.

FIG. 8 shows the arrangement of the fourth embodiment.

According to the arrangement of this embodiment, the antenna conductor of the loop antenna 9, similar to the loop antenna 7 of the second embodiment (FIG. 4), is a linear conductor having a substantially circular cross-section. With this arrangement, the loss resistance R1 becomes smaller than that of the loop antenna 7 in FIG. 4 which is formed by using the belt-like conductor having the same conductor surface area and rectangular cross-section. In addition, a loop antenna having two semicircular ends can obtain the maximum gain.

As described above, according to the present invention, to improve the efficiency of a loop antenna, one or both of short sides of a rectangular loop antenna are formed into semicircular shapes, thereby realizing an antenna having a higher efficiency than the conventional rectangular loop antenna. In addition, the corner portions of the peripheral portion of the housing of a portable radio terminal are rounded to realize a better design or keep the housing strong, and a device to be incorporated in the housing must also be rounded in accordance with the shape of the housing. If a rectangular loop antenna to be incorporated in the peripheral portion of the housing is designed to avoid the round corners of the housing, the antenna size must be decreased. With the loop antenna of the present invention, however, a high antenna efficiency can be obtained without being influenced by the round corners of the inner portion of the housing. In addition, the radio board, the control board, and the loop surface of the loop antenna are placed perpendicular to each other, and a gap is ensured between the radio board and the loop portion of the loop antenna. This arrangement prevents the radio and control boards from blocking the loop opening surface, and the influences of metal parts on the antenna are reduced to suppress a decrease in the antenna gain of the loop antenna.

What is claimed is:

1. A portable compact radio terminal device, comprising:

a radio board coupled to a loop antenna; and a control board including a display section and a battery, said control board connected parallel to said radio board through a connector, wherein at least one end of a parallel portion of said loop antenna is formed into an arcuated shape, a loop surface of said loop antenna is perpendicular to said radio board and said control board, and a gap is formed between said loop surface of said loop antenna and said radio board, said loop surface being closest to said radio board.

2. A device according to claim 1, wherein two ends of said loop antenna, including said one end, are formed into one of semicircular shapes and semi-elliptic shapes.

3. A device according to claim 1, wherein said one end of said loop antenna is formed into a semicircular shape and another end is formed into a semi-elliptic shape.

4. A device according to claim 1, wherein said loop antenna is formed by using a linear conductor having a substantially circular cross-section.

5. A device according to claim 2, wherein said loop antenna is formed by using a linear conductor having a substantially circular cross-section.

6. A device according to claim 3, wherein said loop antenna is formed by using a linear conductor having a substantially circular cross-section.

7. A device according to claim 1, wherein said loop antenna is formed by using a belt-like conductor having a rectangular cross-section.

8. A device according to claim 2, wherein said loop antenna is formed by using a belt-like conductor having a rectangular cross-section.

9. A device according to claim 3, wherein said loop antenna is formed by using a belt-like conductor having a rectangular cross-section.

* * * * *